United States Patent
Lalithambika et al.

(10) Patent No.: US 12,556,089 B2
(45) Date of Patent: Feb. 17, 2026

(54) SWITCHING CONVERTER

(71) Applicant: Renesas Electronics Corporation, Tokyo (JP)

(72) Inventors: Vinod Aravindakshan Lalithambika, Harlow (GB); Christopher John Miller, Harlow (GB); Allan Richard Warrington, Harlow (GB); Benoit Labbe, Harlow (GB)

(73) Assignee: Renesas Electronics Corporation, Tokyo (JP)

( * ) Notice: Subject to any disclaimer, the term of this patent is extended or adjusted under 35 U.S.C. 154(b) by 263 days.

(21) Appl. No.: 18/313,785

(22) Filed: May 8, 2023

(65) Prior Publication Data

US 2024/0380321 A1     Nov. 14, 2024

(51) Int. Cl.
*H02M 3/158*     (2006.01)
*H02M 1/00*     (2006.01)
*H02M 1/08*     (2006.01)

(52) U.S. Cl.
CPC ......... *H02M 3/158* (2013.01); *H02M 1/0025* (2021.05); *H02M 1/08* (2013.01)

(58) Field of Classification Search
CPC .... H02M 3/158; H02M 3/155; H02M 3/1552; H02M 3/1555; H02M 3/156; H02M 3/1563; H02M 3/1566; H02M 3/157; H02M 3/1582; H02M 3/1584; H02M 1/0025; H02M 1/08; H02M 1/082
See application file for complete search history.

(56) References Cited

U.S. PATENT DOCUMENTS

| | | | |
|---|---|---|---|
| 10,333,403 B2 | 6/2019 | Huang et al. | |
| 2013/0314060 A1* | 11/2013 | Chen | H02M 3/158 323/234 |
| 2014/0062434 A1* | 3/2014 | Ouyang | H02M 3/156 323/284 |

OTHER PUBLICATIONS

"Modeling of V2 Current-Mode Control", Li et al, Conference: Applied Power Electronics Conference and Exposition, APEC 2009, Twenty-Fourth Annual IEEE, Mar. 2009.
"Ripple-Based Control of Switching Regulators—An Overview", Redl et al., IEEE Transactions on Power Electronics, vol. 24, No. 12, pp. 2669-2680, Dec. 2009.
"Small-signal Analysis and Design of Constant-on-time V2 Control for Ceramic Caps", Tian, Apr. 19, 2012, Thesis submitted to the Faculty of the Virginia Polytechnic Institute and State University, 103 pages.

* cited by examiner

*Primary Examiner* — Nguyen Tran
(74) *Attorney, Agent, or Firm* — SCULLY, SCOTT, MURPHY & PRESSER, P.C.

(57) ABSTRACT

A switching converter is presented. The switching converter has a high side power switch coupled to a low side power switch at a switching node, a driver and a timing circuit. The driver generates a drive signal having a on-time to drive the high side power switch. The timing circuit generates a control signal to adjust the on-time during a load transient period.

16 Claims, 21 Drawing Sheets

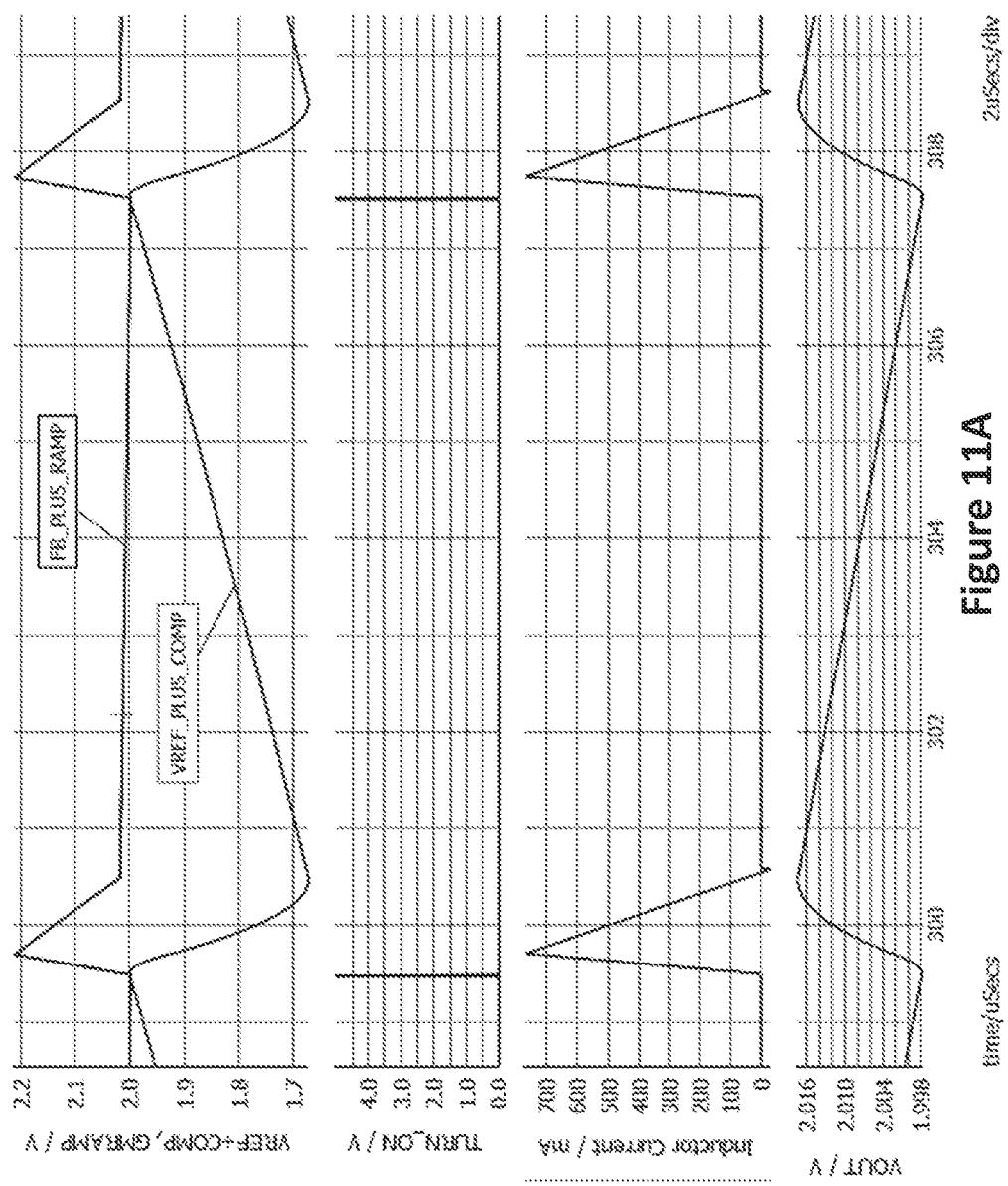

SWITCHING CONVERTER

TECHNICAL FIELD

The present disclosure relates to a switching converter and in particular to a constant on time (COT) switching converter with improved transient response.

BACKGROUND

Constant-on-time, COT, switching converters present several advantages over other types of switching converters including high efficiency under light load and a smooth transition from continuous conduction mode CCM to discontinuous conduction mode DCM of operation. However, conventional COT converters tend to display large undershoot during transient load period, hence limiting the efficiency of the converter. It is an object of the disclosure to address one or more of the above mentioned limitations.

SUMMARY

According to a first aspect of the disclosure, there is provided a switching converter for providing an output voltage, comprising a high side power switch coupled to a low side power switch at a switching node; a driver adapted to generate a drive signal to drive the high side power switch, wherein the drive signal has an on-time; a timing circuit configured to generate a control signal to adjust the on-time during a load transient period.

For instance the load transient period may be a period between a light load condition and a heavy load condition.

Optionally, the timing circuit is adapted to increase the on-time when a load is increasing during the load transient period.

Optionally, in a steady state the on time remains constant. For instance in the steady state, the load may remain substantially constant. When the load is increasing during the load transient period, the on time may be extended beyond the constant on time.

Optionally, the control signal comprises a first signal for turning the high side power switch on and a second signal for turning the high side power switch off.

Optionally, the timing circuit comprises a first circuit adapted to generate the first signal, and a second circuit adapted to generate the second signal; wherein the second circuit is configured to delay assertion of the second signal until a trigger signal is asserted, so as to extend the on-time.

Optionally, the first circuit comprises a compensator circuit coupled to a first comparator, the first comparator having a first input for receiving a first dynamic reference signal from the compensator circuit, a second input for receiving an adjusted ramp signal, a first output for providing the first signal and a second output for providing a first trigger signal.

For instance the first trigger signal may be the first signal inverted.

Optionally, the first dynamic reference signal is proportional to the difference between a reference signal and the output voltage.

Optionally, the first circuit comprises a second comparator, the second comparator having a first input for receiving a second dynamic reference signal from the compensator circuit, a second input for receiving the adjusted ramp signal, a first output for providing a third signal and a second output for providing a second trigger signal.

For instance the second trigger signal may be the third signal inverted.

Optionally, the second dynamic reference signal is proportional to the difference between a reference voltage and the output voltage.

Optionally, during a transient load period the first dynamic reference signal and the second dynamic reference signal diverge. For instance during the transient load period, the second dynamic reference signal may be greater than the first dynamic reference signal.

Optionally, the second circuit comprises a comparator, a capacitor circuit and a AND gate, the comparator having a first input coupled to the capacitor circuit, a second input for receiving the output voltage, and wherein the AND gate has a first input for receiving the output of the comparator, a second input for receiving the trigger signal from the first circuit, and an output for providing the second signal.

Optionally, the switching converter comprises a ramp generator for generating the adjusted ramp signal, wherein the adjusted ramp signal comprises a feedback signal combined with a ramp signal.

Optionally, the ramp generator comprises a synthetic ramp generator.

Optionally, the first signal is high as long as the first dynamic reference signal is greater than the adjusted ramp signal.

Optionally, the third signal is high as long as the second dynamic reference signal is greater than the adjusted ramp signal.

Optionally, the compensator circuit comprises a transconductance amplifier coupled to a Type II dual compensator circuit. For instance the transconductance amplifier has a first input coupled to the reference voltage and a second input coupled to the feedback voltage.

According to a second aspect of the disclosure there is provided a method of controlling a switching converter having a high side power switch coupled to a low side power switch; the method comprising
  generating a drive signal to drive the high side power switch, wherein the drive signal has an on-time; and
  generating a control signal to adjust the on-time during a load transient period.

Optionally, wherein in a steady state the on time remains constant and wherein when the load is increasing during the load transient period, the on time is extended beyond the constant on time.

The options described with respect to the first aspect of the disclosure are also common to the second aspect of the disclosure.

DESCRIPTION OF THE DRAWINGS

The disclosure is described in further detail below by way of example and with reference to the accompanying drawings, in which:

FIG. 11A is a waveform diagram illustrating the operation of a QRSR COT converter in a pulse frequency modulation (PFM) mode;

DESCRIPTION

Figure 1A:
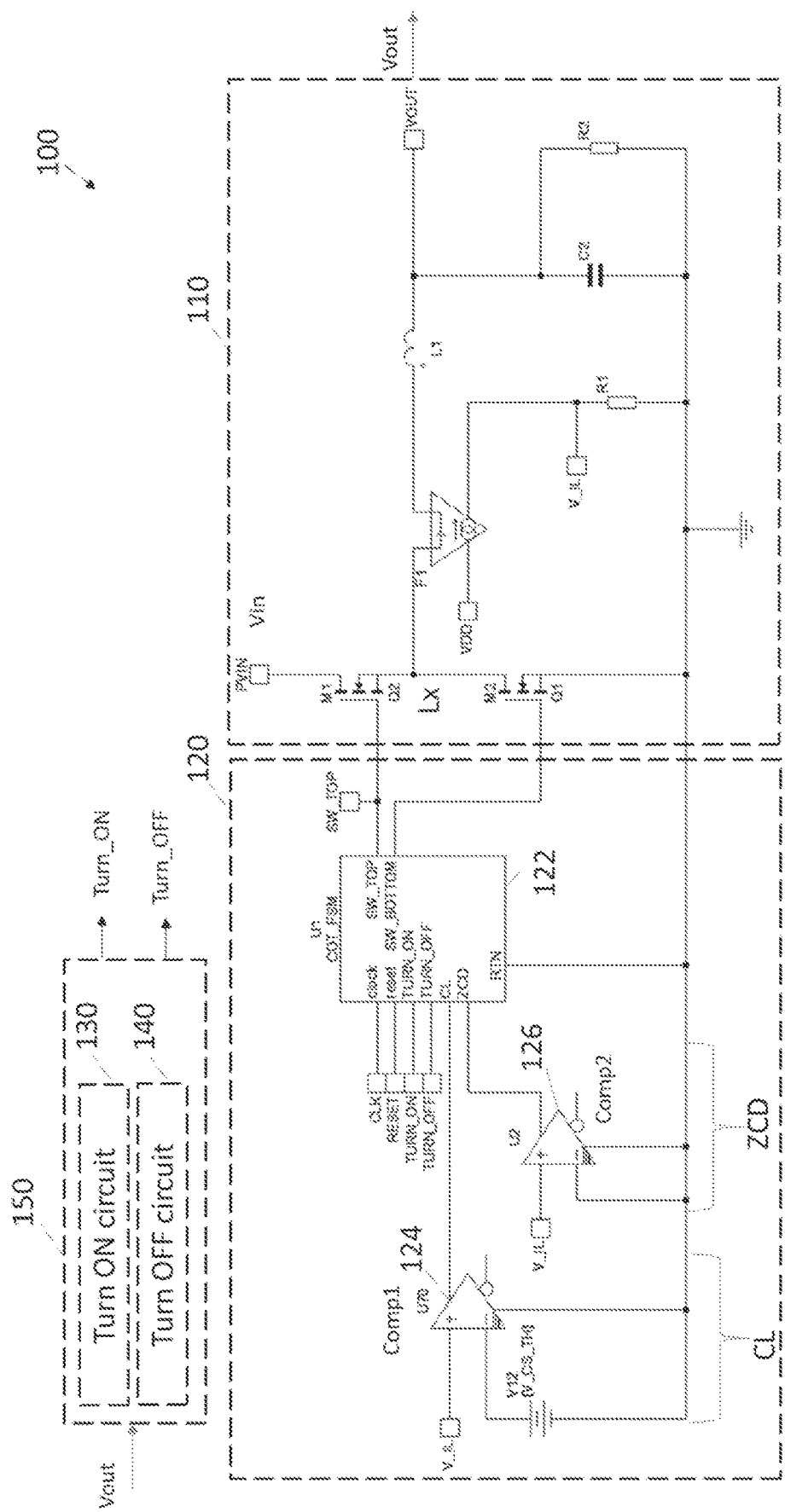
FIG. 1A is a constant on-time switching converter according to the prior art.

FIG. 1A illustrates a constant on-time switching converter 100 according to the prior art. The converter includes an output stage 110 coupled to a driver 120 and a timing circuit 150 in a feedback loop.

The output stage 110 is formed of a high side power switch M1 and a low side power switch M2 coupled to an inductor L1 at a switching node LX. A current sense circuit formed by the sensor F1 and the resistance R1 is coupled to the inductor L1. The sensor F1 is used to sense the current through the inductor, and outputs a current proportional to the inductor current. The resistor R1 converts the output current from F1 to a voltage proportional to the inductor current.

The driver 120 includes a state machine 122 such as a finite state machine FSM, coupled to a zero current detection circuit (ZCD) for detecting a zero inductor current, and a current limit circuit (CL) which limits the inductor current. The ZCD circuit is formed of comparator 126. The current limit circuit is formed of comparators 124 and the current sense circuit (F1 & R1).

The timing circuit 150 is configured to send a control signal to the driver 120 to control the high-side and low-side power switches. The timing circuit 150 has a first circuit referred to as turn ON circuit 130 for generating a Turn_ON signal, and a second circuit referred to as turn OFF circuit 140 for generating a Turn_OFF signal. Together, the Turn_ON signal and the Turn_OFF signal form the timing control signal. The timing control signal may be a waveform pulse such as a pulse width modulation PWM signal.

Figure 1C:
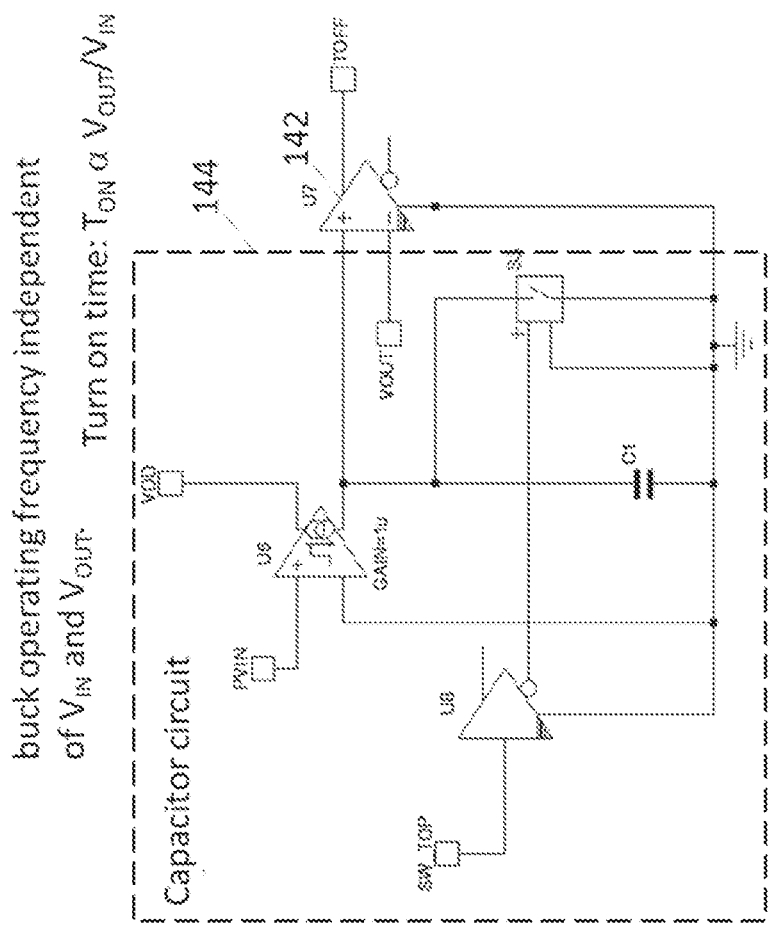
FIG. 1C is a turn off circuit for use in the COT converter of FIG. 1A.
Figure 1B:
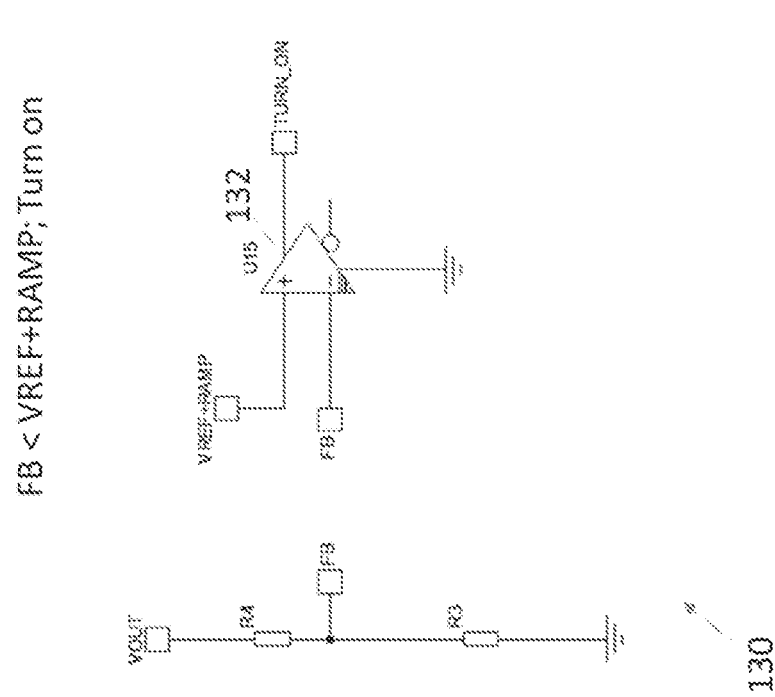
FIG. 1B is a turn on circuit for use in the COT converter of FIG. 1A.

FIG. 1B shows a turn ON circuit. The turn ON circuit 130 includes a comparator 132 having a non-inverting input for receiving a voltage VREF+VRAMP, an inverting input for receiving a feedback voltage FB, and one output for providing a Turn_ON signal to the driver 120.

FIG. 1C shows a turn OFF circuit 140. The turn OFF circuit 140 includes a comparator 142 having a non-inverting input coupled to the output of a capacitor circuit 144, an inverting input for receiving the output voltage Vout from the converter, and an output for providing a Turn_OFF signal to the driver 120. The capacitor circuit 144, also referred to as COT timer, is configured to provide a voltage associated with the capacitor C1. As soon as the switch S3 is released, the capacitator C1 is charged up linearly by a current generated by transconductance amplifier U6. When the voltage on the capacitor exceeds the VOUT voltage the comparator 142 output (TOFF) goes high. The current charging the capacitor is proportional to "PVIN" where PVIN is the input voltage to the buck converter. The time delay between the release of the switch and the TOFF output going high is the period for which the high side power switch "M1" is turn on (TON time). With this arrangement the ON time is proportional to VOUT/VIN and the buck switching frequency becomes independent of VIN and VOUT.

In operation, when VFB is lower than VREF+RAMP, the comparator 132 initializes PWM high by asserting the Turn_ON signal (logic high) and the TON timer start. The gate driver 120 then turns on the high side switch M1 and turns off the low side switch M2 for a fixed duration D*T, where D is the duty cycle and T is the switching period, hence the name "constant on-time switching converter". When that fixed duration determined by the capacitor circuit 144 expires, the comparator 142 asserts the Turn_OFF signal (logic high) so the PWM goes low. The driver 120 then turns off the high side switch M1 and turns on the low side switch M2. The output voltage is regulated to be D*Vin, where Vin is the supply voltage.

Figure 1D:
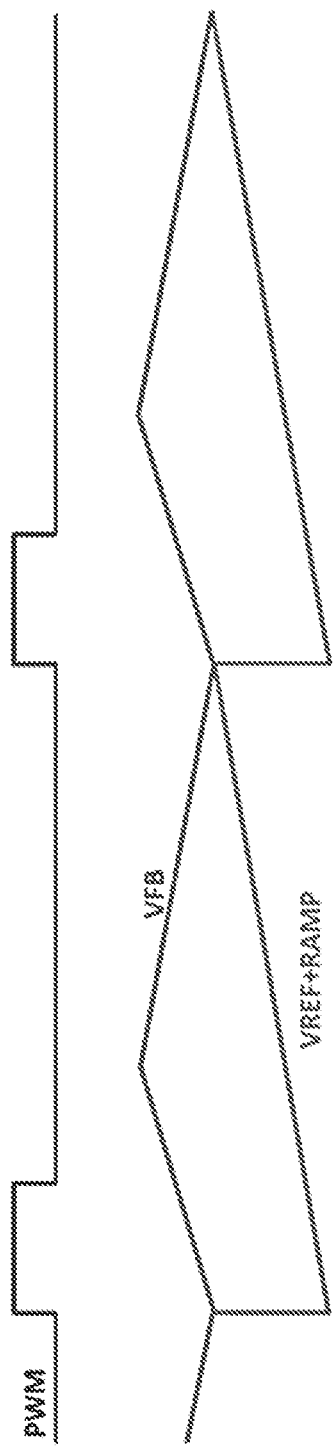
FIG. 1D is a waveform diagram illustrating the operation of the converter of FIG. 1A.

FIG. 1D is a waveform diagram illustrating the operation of the circuit of FIG. 1A, showing the PWM signal, the feedback voltage VFB and a combine voltage that include the reference voltage VREF with the ramp added to it (VREF+RAMP). Ideally, when the PWM initialize a up (COT input latch the VFB cross VREF+RAMP condition until the TON finish), the VREF voltage jumps down (for instance by about 10 mv), then ramp up slowly in the whole cycle. Once TON has expired, the TOFF will start and the VFB voltage ramps down. When VFB reach VREF+RAMP, the next cycle starts. When the VFB is ramping down, the VREF+RAMP is ramping up. In order for the VFB, VREF+RAMP cross point to be "Vref", then we need: (1) Control the VREF jump down ~10 mV and (2) Control the VREF ramp in the whole cycle.

Figure 1E:
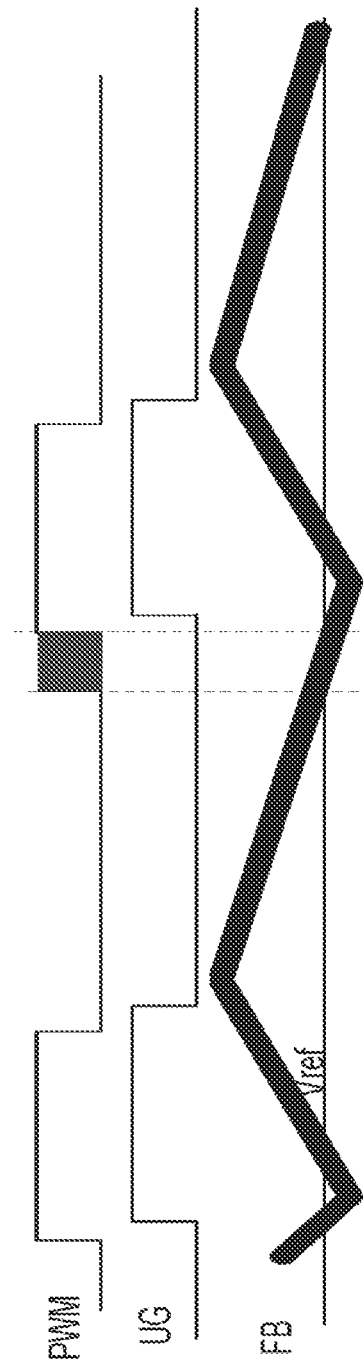
FIG. 1E is a waveform diagram illustrating a modified version of the circuit of FIG. 1A.

FIG. 1E is a waveform diagram illustrating the operation of a modified version of the converter of FIG. 1A. In this example the turn on circuit 130 is modified so that there is no ramp signal and the comparator 132 is used to compare VFB directly with VREF.

In operation the COT_FSM (122) starts TOFF(min) timer. During the TOFF(min) timer period, the FB comparator 132 is blanked. After the TOFF(min) timer finishes, the comparator 132 is un-blocked and wait for the condition VFB<VREF condition. When the VFB<VREF, the signal SW_TOP goes high and turns on the upper switch M1. Since there is noise on VFB, the SW_TOP rising edge will have jitter. The jitter is determined by the VFB falling slope.

Figure 1F:
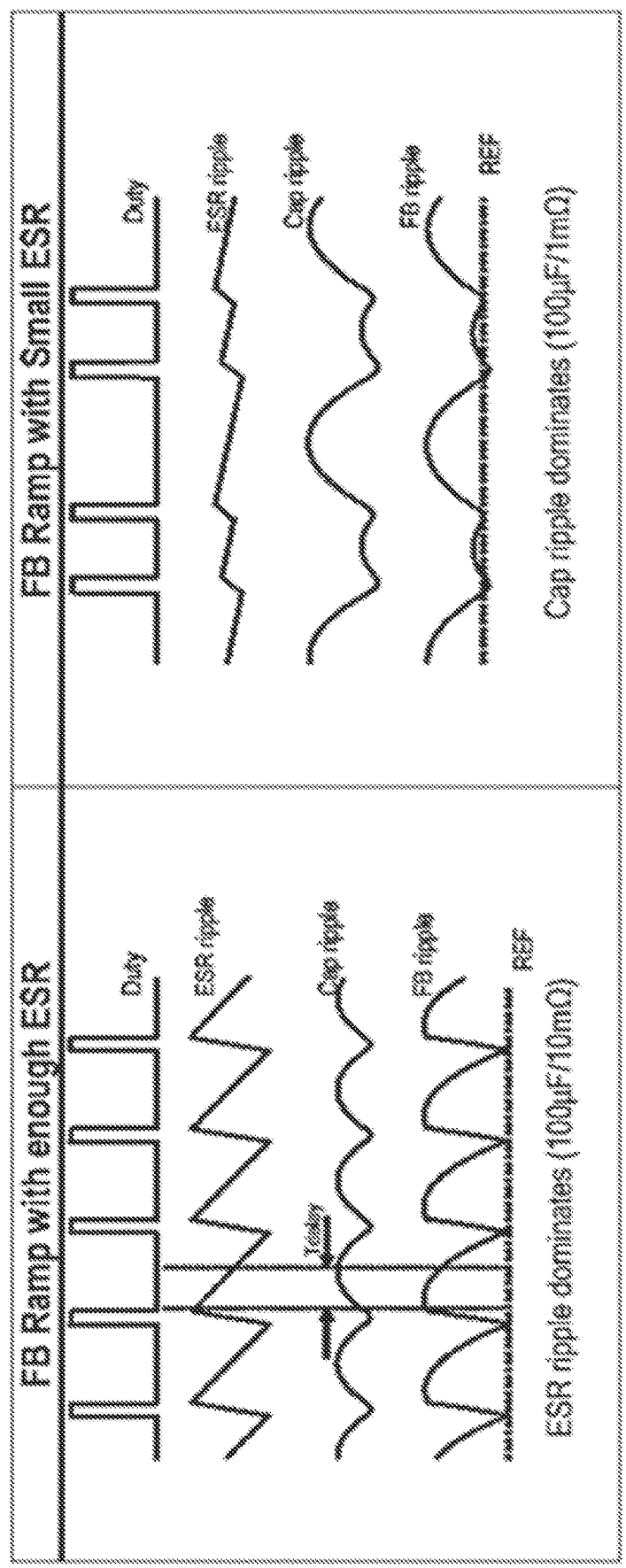
FIG. 1F is a diagram illustrating ripples observed for different circuit configurations.

FIG. 1F is a diagram illustrating ripples observed for different circuit configurations. Selecting a small ESR capacitor as an output capacitor (C2 in 110) requires an external RC compensator. The system is susceptible to instability due to output ripples.

Figure 2A:
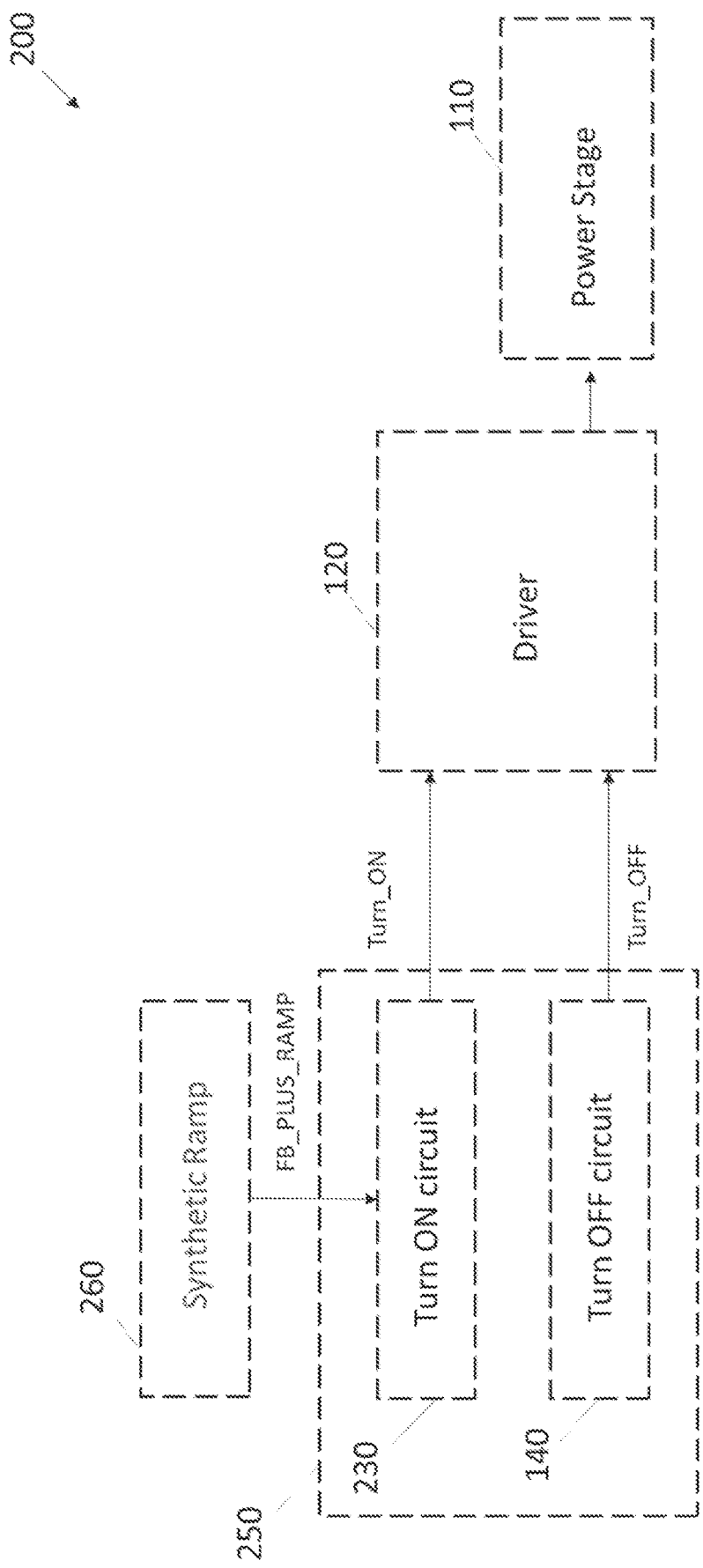
FIG. 2A is a diagram of another constant on-time switching converter according to the prior art.

FIG. 2A illustrates another constant on-time switching converter 200 according to the prior art. The circuit 200 shares many similar components to those illustrated in the circuit 100 of FIG. 1. The same reference numerals have been used to represent corresponding components and their description will not be repeated for sake of brevity. The turn on circuit 230 and the turn off circuit 140 form the timing circuit 250. In this case a synthetic ramp 260 is coupled to a turn ON circuit 230. The components 260, 230, 140 and 120 form a Synthetic Ramp (SR) COT buck controller.

In FIG. 1A, when the high side power switch M1 is on and the low side power switch M2 is off, the inductor current increases at a rate proportional to (PVIN−VOUT)/L1. When M2 is on and M1 is off the inductor current falls at a rate proportional to −VOUT/L.

Figures 2B, 2C:
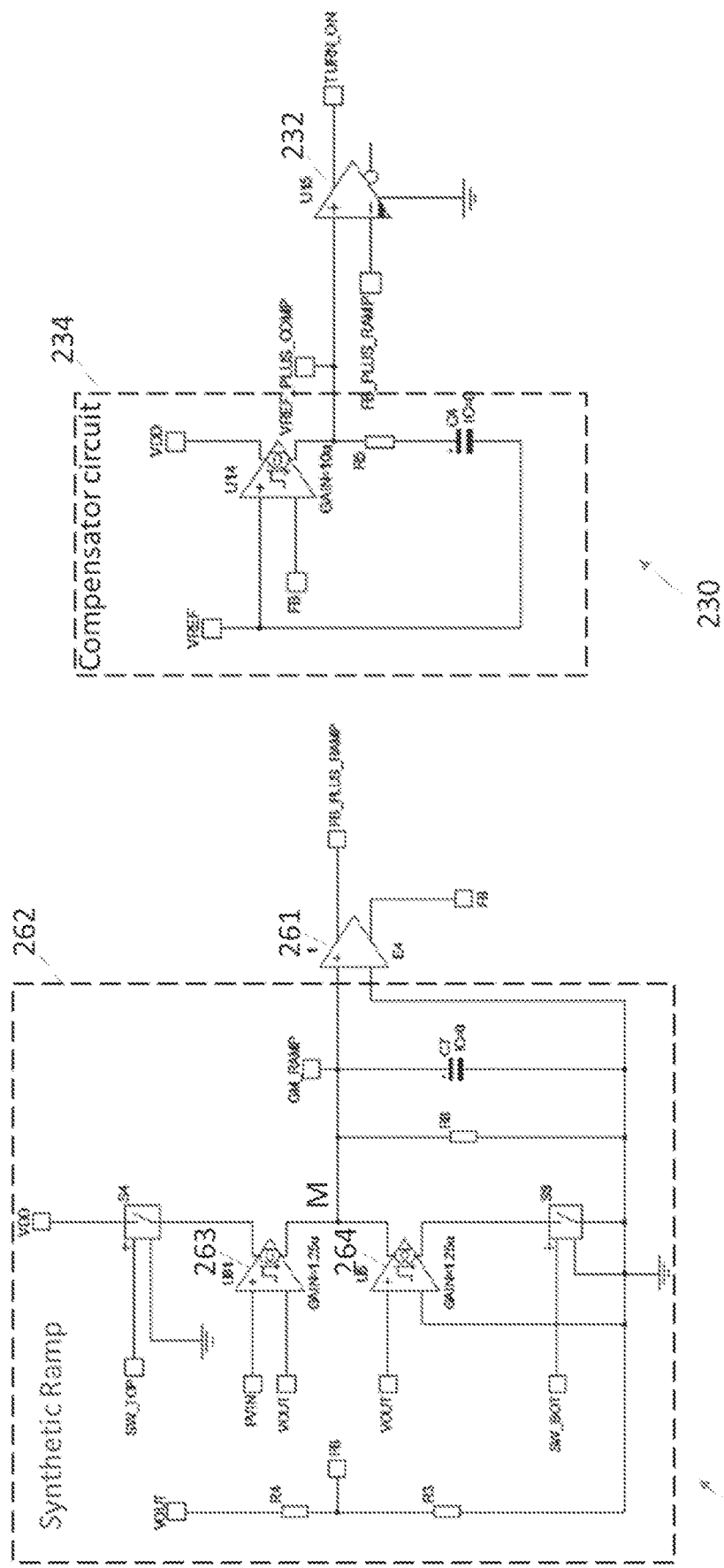
FIG. 2B is a diagram of a synthetic ramp circuit.
FIG. 2C is a turn on circuit for use in the COT converter of FIG. 2A.

FIG. 2B shows the synthetic inductor current ramp circuit, simply referred to as synthetic ramp circuit. The circuit 260 comprises an adder 261 coupled to a ramp generator 262. The ramp generator 262 includes two transconductance amplifiers (gm amplifiers) 263 and 264 coupled at node M. The gm amplifier 263 is coupled to the voltage ramp VDD via a switch S4. The gm amplifier 264 is coupled to ground via a switch S9. A capacitor C4 is provided between the node M and ground.

In operation, the circuit 262 produces a voltage ramp (GM_RAMP) that is proportional to the inductor current. The signals SW_TOP and SW_BOT control the state of switches S4 and S9, respectively. As a result, the top switch S4 and bottom switch S9 mimic the high side power switch M1 and the low side power switch M2, respectively. When the top switch S4 is on, (SW_TOP is high) and the bottom switch S9 is off (SW_BOT=Low), the gm amplifier 263 produces a current (PVIN−VOUT)*GAIN. This charges the capacitor C7 to create a voltage ramp that increases at a rate proportional to (PVIN−VOUT)*GAIN/C7. When the switch S9 is on (SW_BOT is high) and the switch S4 is off (SW_TOP is low), the GM amplifier 264 produces a current (VOUT)*GAIN. This discharges the capacitor C7 to create a voltage ramp that decreases at a rate proportional to (−VOUT)*GAIN/C7. The gm amplifiers 263 and 264 together produce a synthetic ramp GM_RAMP that is proportional to the inductor current and holds the DC current information of the inductor. The adder 261 adds the feedback FB signal to the GM_RAMP signal generated by the ramp generator 262. The synthetic ramp circuit 260 improves the stability of the loop compared to the COT of FIG. 1, even with lower equivalent series resistance (ESR) capacitor.

FIG. 2C shows the turn ON circuit. The turn ON circuit 230 includes a comparator 232 coupled to a compensator circuit 234. The compensator circuit 234 is designed to take out the error between the reference voltage (VREF) and the feedback voltage at FB (VFB). The compensator circuit is a Type II compensator. A Type II compensation amplifier U14 adds an RC branch to flatten the gain and improve the phase response in the mid-frequency range. The increased phase is achieved by increasing the separation of the pole and zero of the compensation. The comparator 232 has a non-inverting input for receiving a voltage VREF_PLUS_COMP from the compensator circuit, an inverting input for receiving a voltage FB_PLUS_RAMP from the synthetic ramp circuit 260, and an output for providing a Turn_ON signal to the driver 120. The voltage FB_PLUS_RAMP may be referred to as the adjusted ramp signal.

Figure 3:
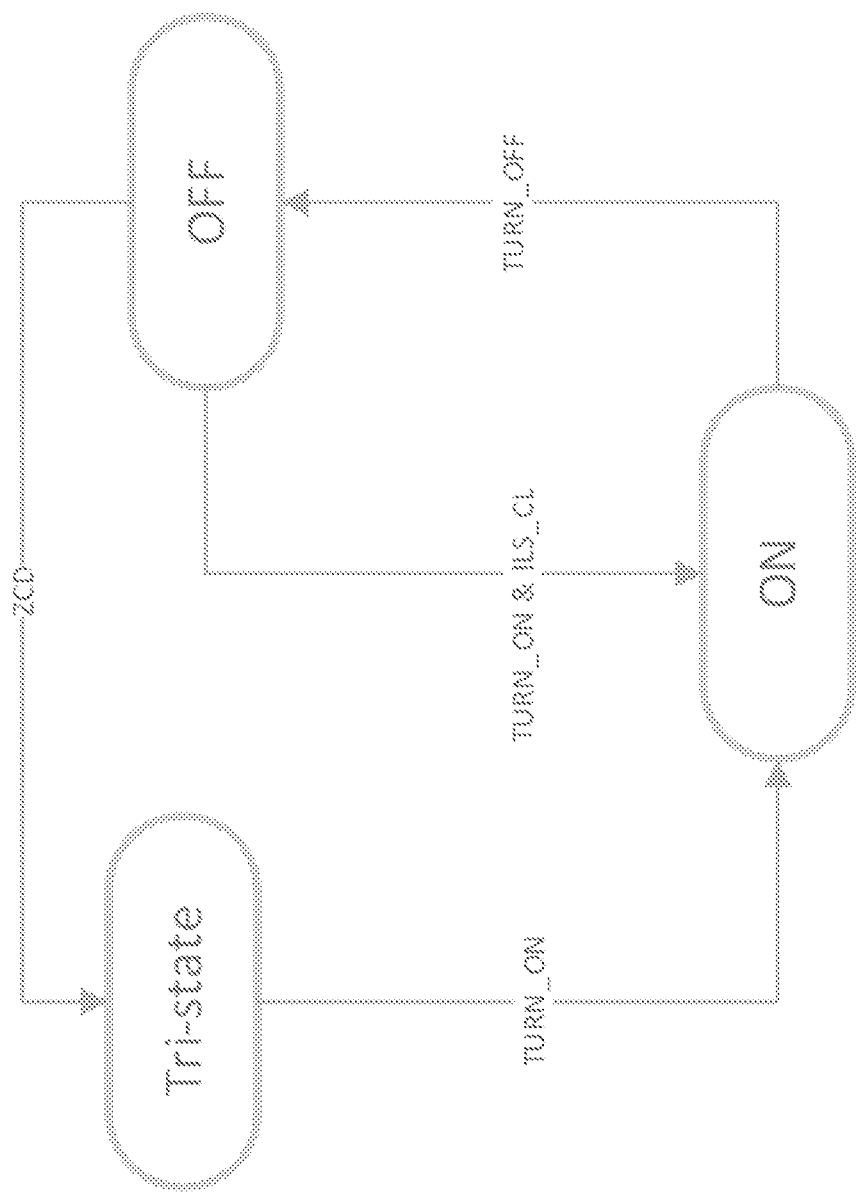
FIG. 3 is a state diagram illustrating the operation of the COT converters of FIGS. 1A and 2A.

FIG. 3 is a state diagram illustrating the operation of the COT converters of FIGS. 1A and 2A. Three states are represented, referred to as ON state, OFF state, and Tri-state.

In the ON state, the high-side power switch is on, and the low-side power switch is off. In the OFF state, the high-side power switch is off, and the low-side power switch is on. The Tri-state occurs when the switched mode power supply operates in a discontinuous current mode (DCM), when both the high-side power switch and the low-side power switch are turned off. The tri-state may start after the inductor current IL reaches a zero value to operate the switch-mode power supply in DCM. The tri-state can last from several µs to several ms.

If the current state is "OFF" and if the ZCD circuit detects that the inductor current IL has reached a zero value, the switching converter enters the Tri-state. When the turn ON circuit enables the Turn_ON signal, the high-side power switch is turned ON (ON state). When the Turn OFF circuit enables the Turn_OFF signal, the high-side power switch is turned OFF (OFF state).

The Turn_ON signal is provided by the output of the comparator 232 comparing VREF_PLUS_COMP vs FB_PLUS_RAMP. Once in TON state, the TOFF signal goes high when the constant on time is finished. The ZCD circuit determines when the inductor current has crossed zero. The Low side current limit signal (LS_CL) provided by comparator 124 goes high if inductor current>current limit.

Figure 4:
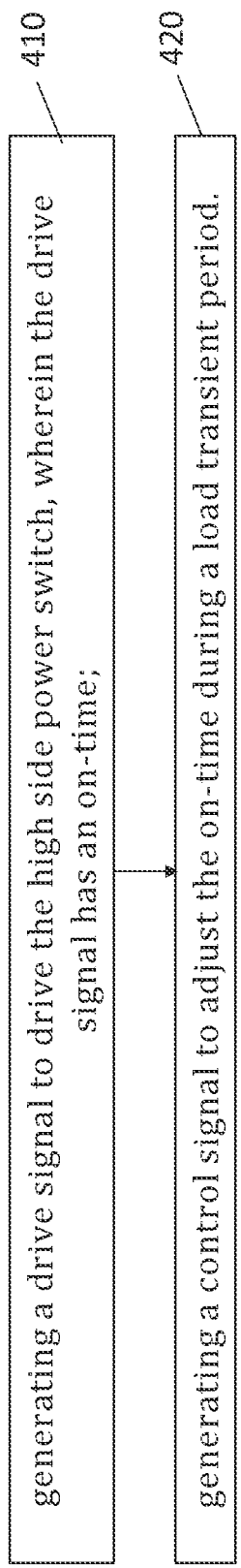
FIG. 4 is a flow chart of a method for controlling a switching converter according to the disclosure.

FIG. 4 is a flow chart of a method for controlling a switching converter according to the disclosure. The switching converter has an inductor coupled to a high side power switch and a low side power switch at a switching node. At step 410 a drive signal is generated to drive the high side power switch. The drive signal has an on-time. At step 420 a control signal is generated to adjust the on-time during a load transient period.

For instance in a steady state the on-time may remain constant. When the load is increasing during the load transient period, the on time is extended beyond the constant on-time.

This method allows for the inductor current IL through the inductor to increase rapidly. Compared to conventional COT controllers, this reduces undershoot during load transient and improves the efficiency of the switching converter.

Figure 5A:
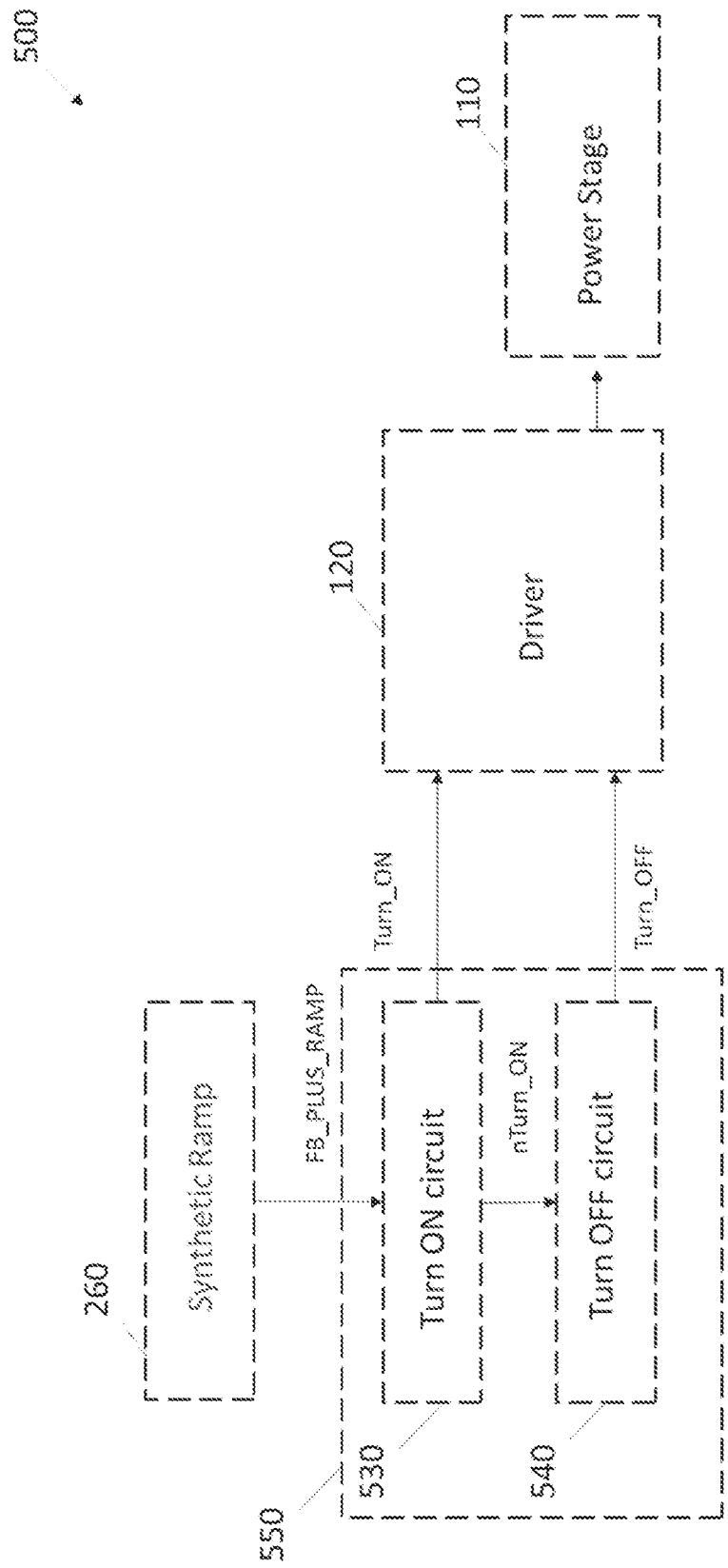
FIG. 5A is a diagram of a switching converter for implementing the method of FIG. 4.

FIG. 5A is a diagram of a switching converter for implementing the method of FIG. 4. The circuit 500 shares many similar components to those illustrated in the circuit 200 of FIG. 2. The same reference numerals have been used to represent corresponding components and their description will not be repeated for sake of brevity. The turn on circuit 530 and the turn off circuit 540 form the timing circuit 550. The components 260, 530, 540 and 120 form a Quick response synthetic ramp (QRSR) COT buck controller.

Figure 5B:
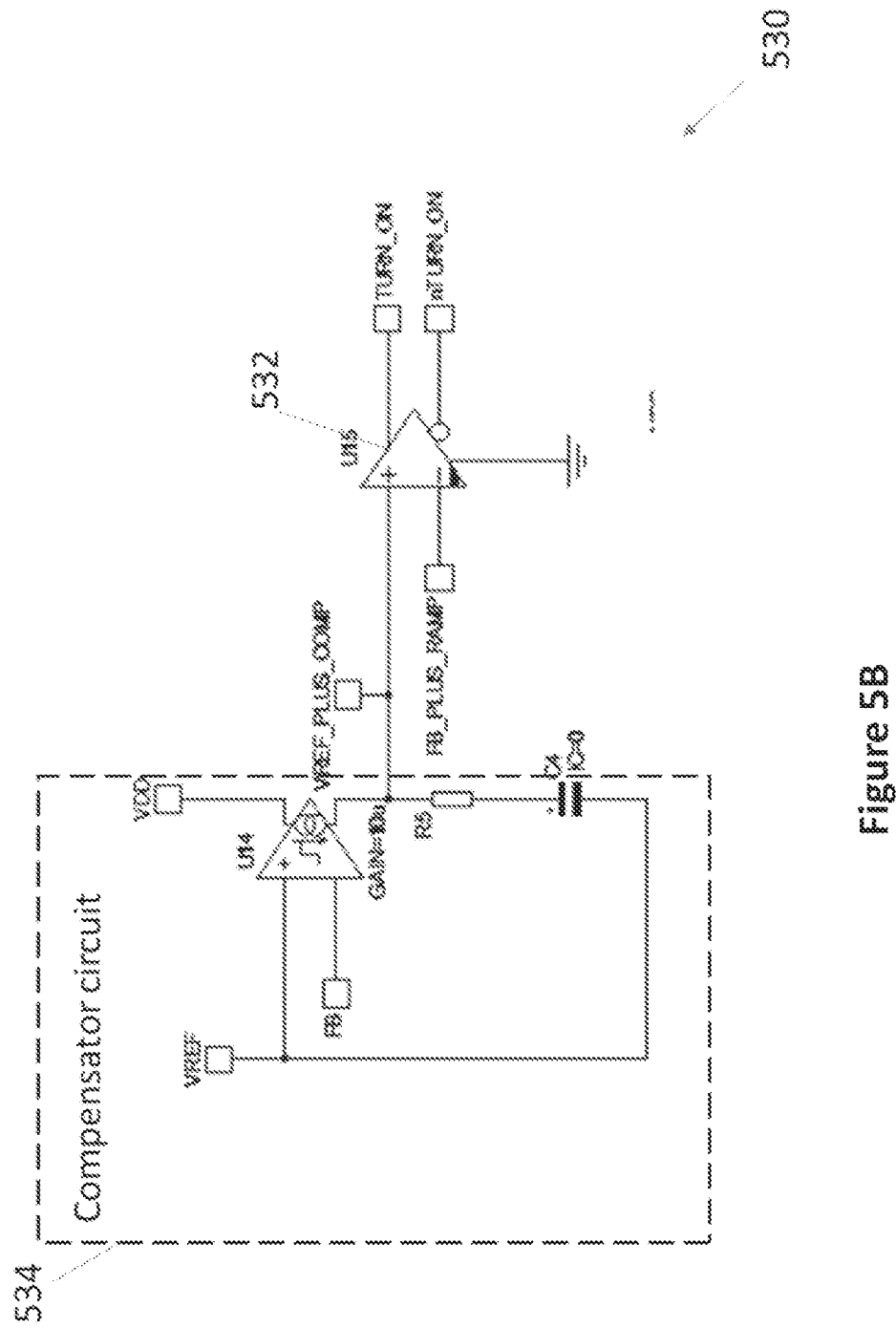
FIG. 5B is a turn on circuit for use in the COT converter of FIG. 5A.

FIG. 5B shows an implementation of a turn ON circuit for the circuit 5A. The turn ON circuit 530 is similar to the circuit 230 of FIG. 2C, however in this case the comparator 532 is adapted to provide two signals the Turn_ON signal, and the inverted Turn_ON signal, nTurn_ON, also referred to as first trigger signal.

Figure 5C:
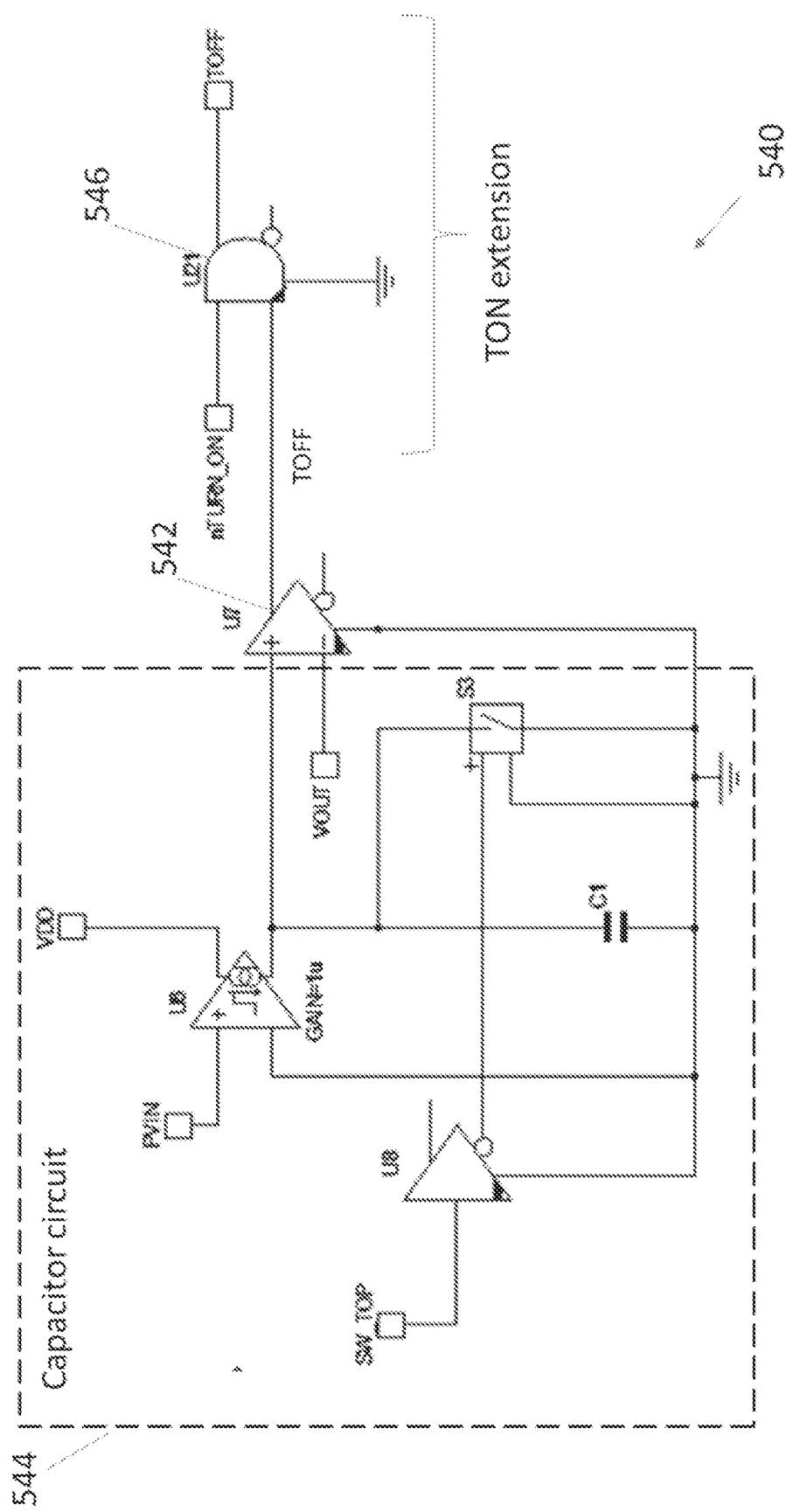
FIG. 5C is a turn off circuit for use in the COT converter of FIG. 5A.

FIG. 5C shows an implementation of a turn OFF circuit for the circuit 5A. The turn OFF circuit 540 is similar to the circuit 140 of FIG. 1C, however in this case an additional AND gate 546 is provided. The AND gate 546 has a first input for receiving the output of the turn off comparator 542, a second input for receiving the signal nTurn_ON from circuit 530 and an output for providing the TOFF signal.

The AND gate 546 is used to extend the ON time. When the output of the comparator 542 is high, TOFF at the output of the AND gate is high only when nTURN_ON is high. When the TURN_ON signal is high, nTURN_ON is low and the output of the AND gate is low, so TOFF is low. When the TURN_ON signal is low, nTURN_ON is high and the output of the AND gate is high, so TOFF is high. Stated another way the TOFF signal is gated off as long as the output of the turn on comparator 532 is high. The TURN_ON signal provided by the comparator 532 is high as long as VREF_PLUS_COMP>FB_PLUS_RAMP. The high-side power switch M1 turns on when the adjusted ramp signal FB_PLUS_RAMP falls below the dynamic reference signal VREF_PLUS_COMP. M1 remains on for at least a constant on-time period. The on time is extended beyond the constant on-time period if the output of the comparator 532 is high.

Figure 6:
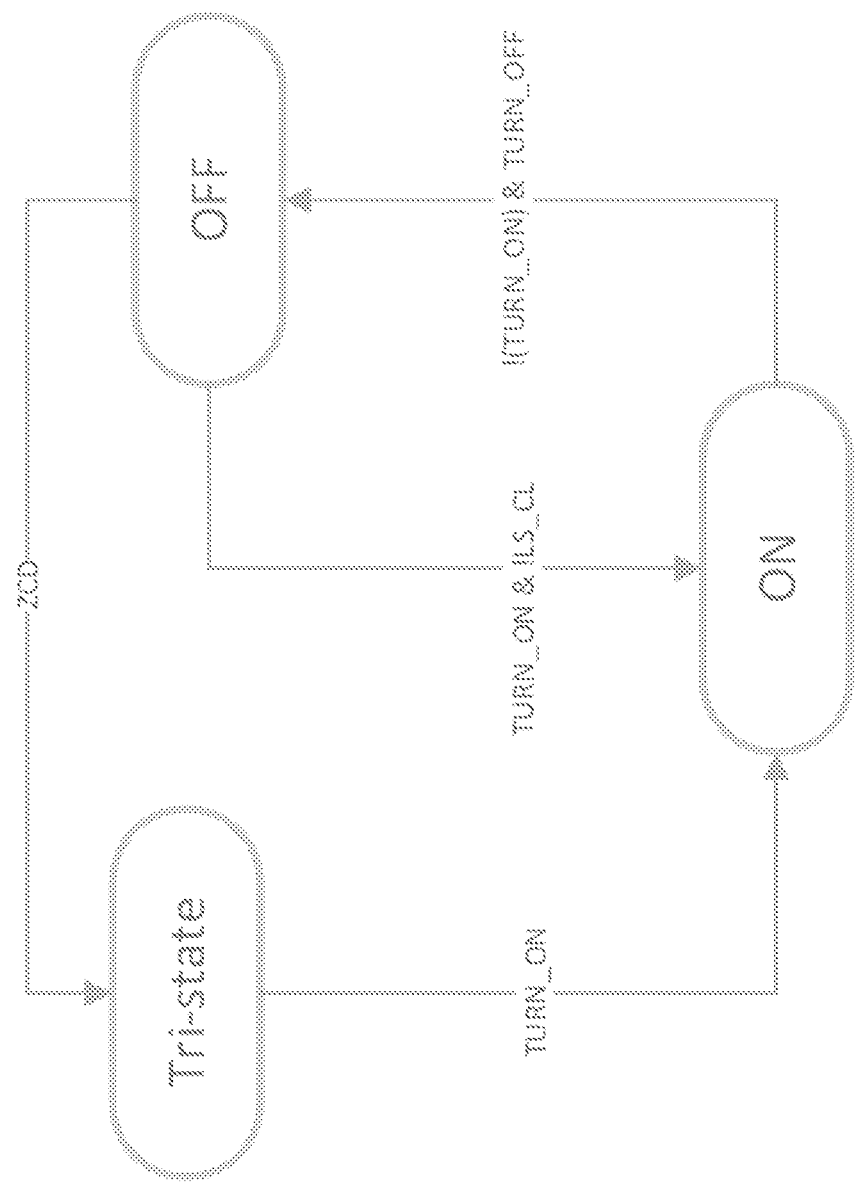
FIG. 6 is a state diagram illustrating the operation of the COT converter of FIG. 5A.

FIG. 6 is a state diagram illustrating the operation of the COT converter of FIG. 5A. Compared with the state diagram of FIG. 3, the transition from the ON state to the OFF state is now qualified by the Turn_ON signal.

Figure 7:
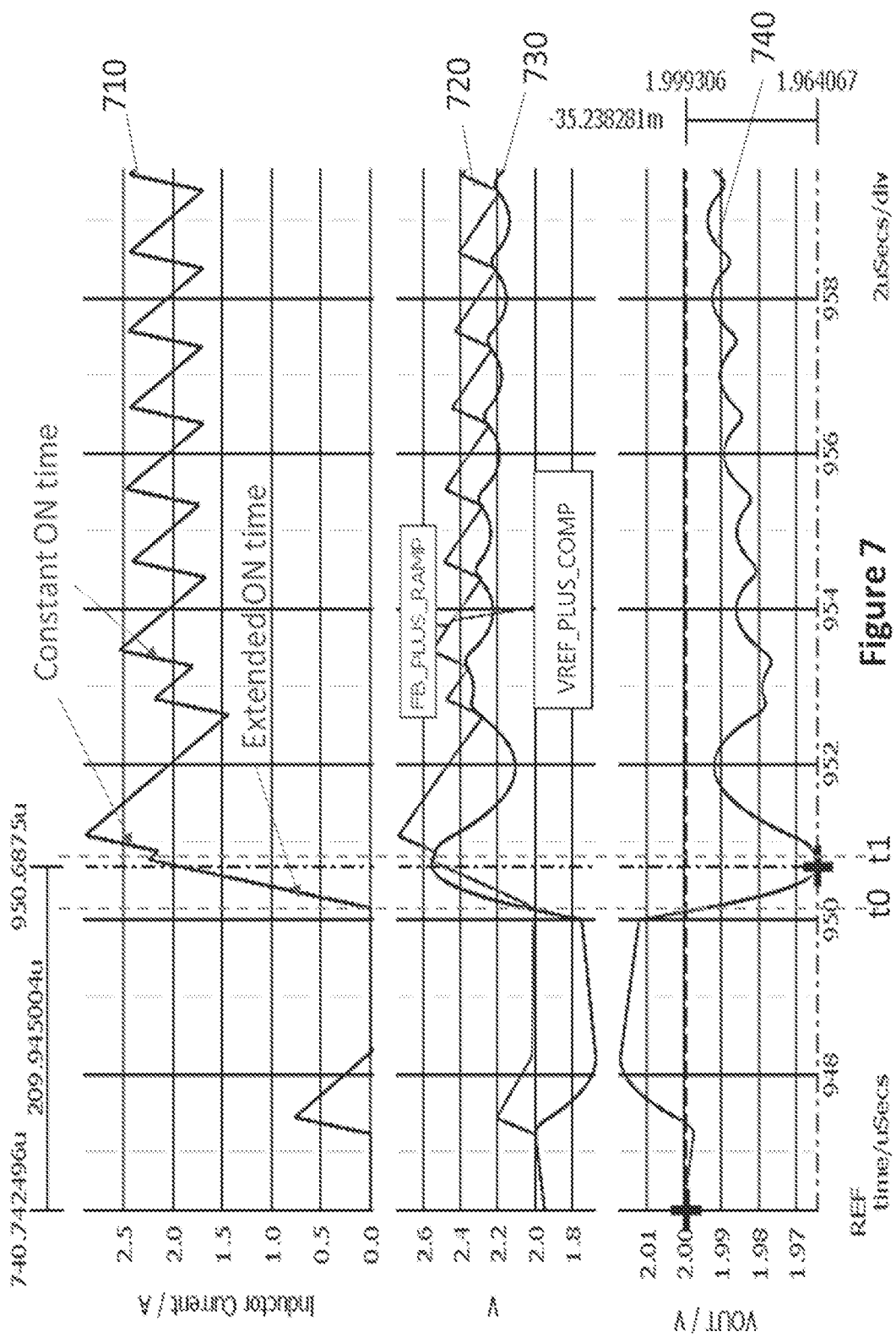
FIG. 7 is a waveform diagram illustrating the operation of the circuit of FIG. 5A during a load transient.

FIG. 7 is a waveform diagram illustrating the operation of the circuit of FIG. 5A during a load transient. FIG. 7 shows the inductor current 710, the adjusted ramp signal FB_PLUS_RAMP signal 720, the dynamic reference signal VREF_PLUS_COMP signal 730 and the output voltage VOUT 740. The inductor current has a saw tooth profile. The rising time of the inductor current IL corresponds to the on time of the high side power switch. Between the times t0 and t1, VREF_PLUS_COMP (730) is above FB_PLUS_RAMP (720) and the ON time is extended beyond the constant ON time. In this example the load transient goes from a light load of 50 mA up to a heavy load of 2A in 1 ns. The output voltage VOUT=2V, and the undershoot=36 mV (1.8%).

Figure 8A:
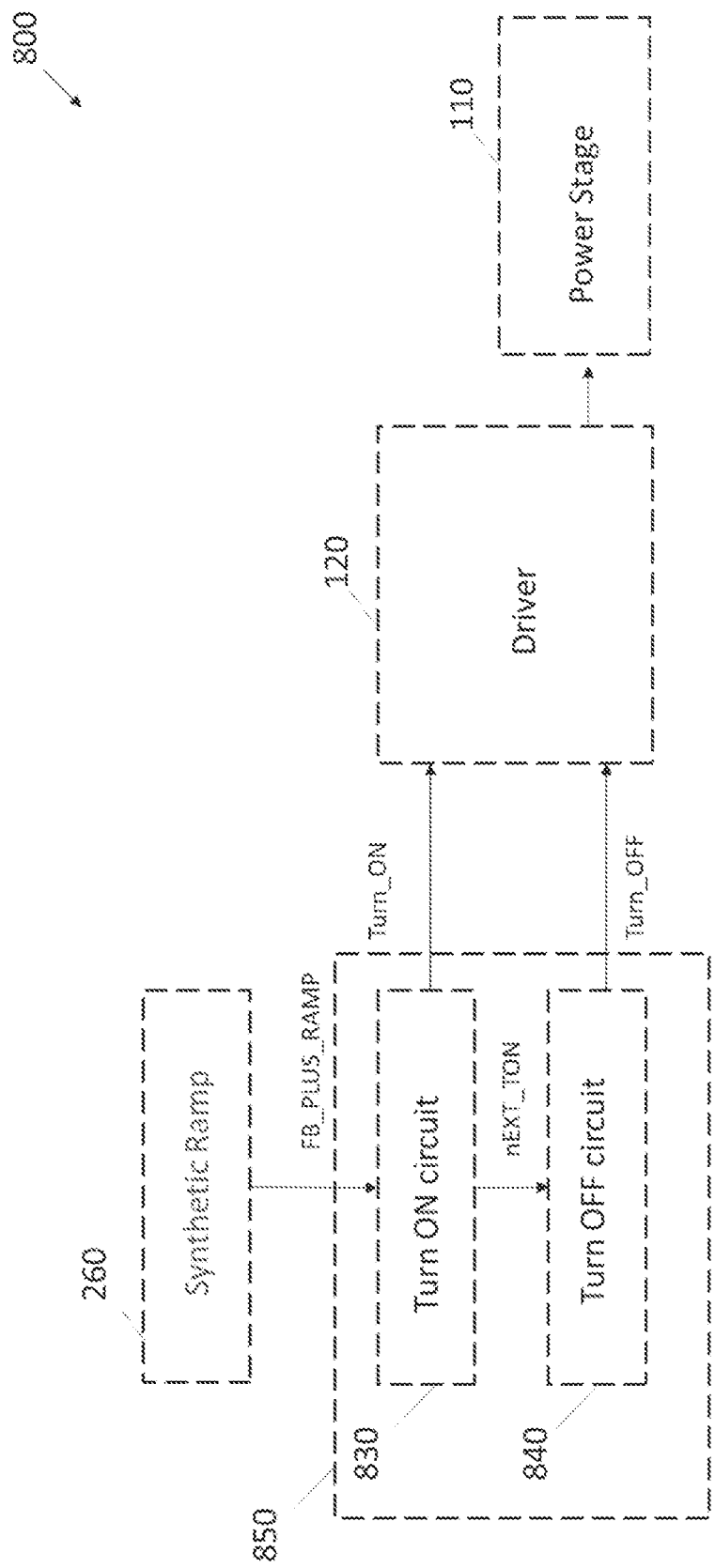
FIG. 8A is a diagram of another switching converter for implementing the method of FIG. 4.

FIG. 8A is a diagram of another switching converter for implementing the method of FIG. 4. The circuit 800 shares many similar components to those illustrated in the circuit 500 of FIG. 5. The same reference numerals have been used to represent corresponding components and their description will not be repeated for sake of brevity. The turn on circuit 830 and the turn off circuit 840 form the timing circuit 850. The components 260, 830, 840 and 120 form a QRSR_COT buck controller.

Figure 8B:
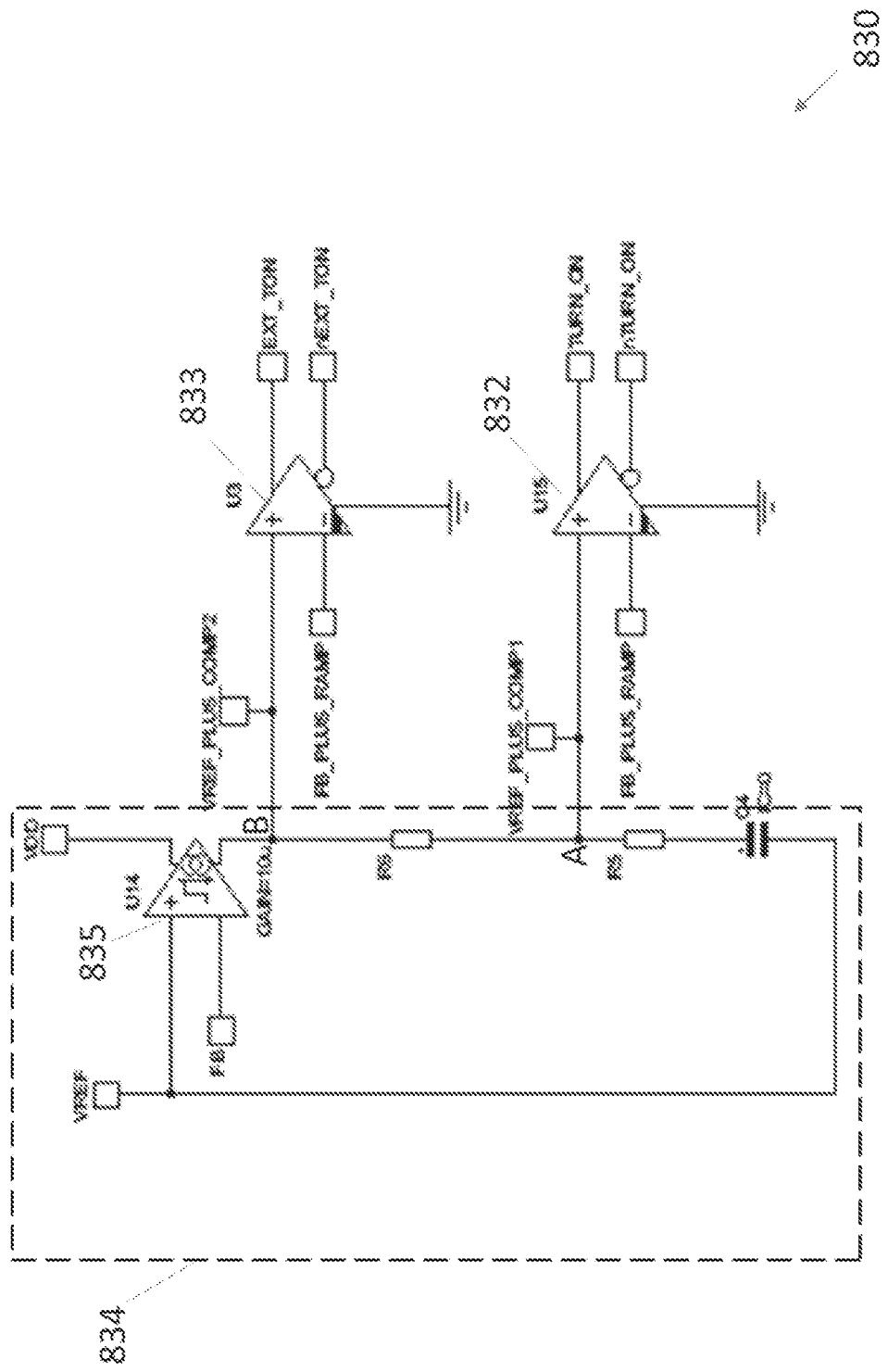
FIG. 8B is a turn on circuit for use in the COT converter of FIG. 8A.

FIG. 8B shows an implementation of a turn ON circuit for the circuit 8A. The turn ON circuit 830 is similar to the circuit 530 of FIG. 5B, however in this case an additional comparator is provided to the compensator circuit 834. The compensator circuit 834 includes a transconductance amplifier (gm amplifier) 835 comparing VREF with VFB, coupled to a Type II dual compensator circuit (R5, R6 and C4) for providing the voltages VREF_PLUS_COMP 1 at node A and VREF_PLUS_COMP 2 at node B.

The voltage VREF_PLUS_COMP 1 may be referred to as the first dynamic reference signal, and the voltage VREF_PLUS_COMP 2 may be referred to as the second dynamic reference signal. The voltage signals VREF_PLUS_COMP 1 and VREF_PLUS_COMP 2 are proportional to the difference between the reference voltage Vref and the feedback voltage FB, and so proportional to the difference between Vref and the output voltage Vout.

The first comparator 832 has a non-inverting input for receiving the voltage VREF_PLUS_COMP 1 (first dynamic reference signal) from the compensator circuit 834, an inverting input for receiving the voltage FB_PLUS_RAMP (adjusted ramp signal) from the synthetic ramp 260, a first output for providing a Turn_ON signal to the driver 120, and a second output for provided the inverted Turn_ON signal.

The second comparator 833 has a non-inverting input for receiving the voltage VREF_PLUS_COMP 2 (second dynamic reference signal) from the compensator circuit 834, an inverting input for receiving a voltage FB_PLUS_RAMP (adjusted ramp signal) from the synthetic ramp 260, a first output for providing an EXT_ON signal, and a second output for providing the inverted signal nEXT_TON to the turn off circuit 840. The inverted signal nEXT_TON is also referred to as the second trigger signal.

The output of the second comparator 833 is high as long as VREF_PLUS_COMP2>FB_PLUS_RAMP. The high-side power switch M1 turns on when the adjusted ramp signal FB_PLUS_RAMP falls below the first dynamic reference signal VREF_PLUS_COMP1. M1 remains turned on for at least a constant on time period. The on time is extended beyond the COT time, if the EXT_TON signal is high. M1 will remain high as long as EXT_TON is high.

Figure 8C:
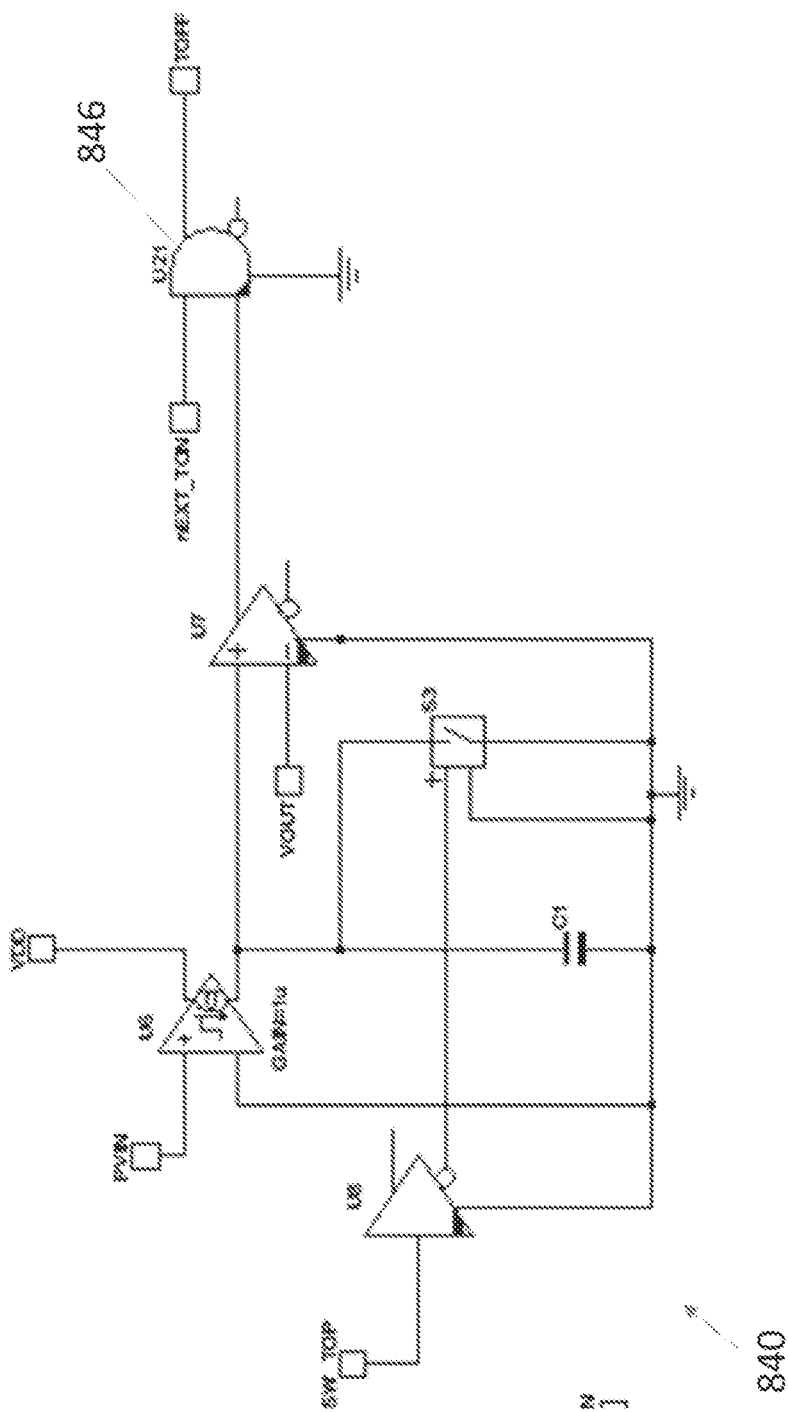
FIG. 8C is a turn off circuit for use in the COT converter of FIG. 8A.

FIG. 8C shows an implementation of a turn OFF circuit for the circuit 8A.

The turn OFF circuit 840 is the same as the circuit 140 of FIG. 1C, however in this case the AND gate 546/846 receives the signal nEXT_TON instead of the signal nTurn_ON.

Figure 9:
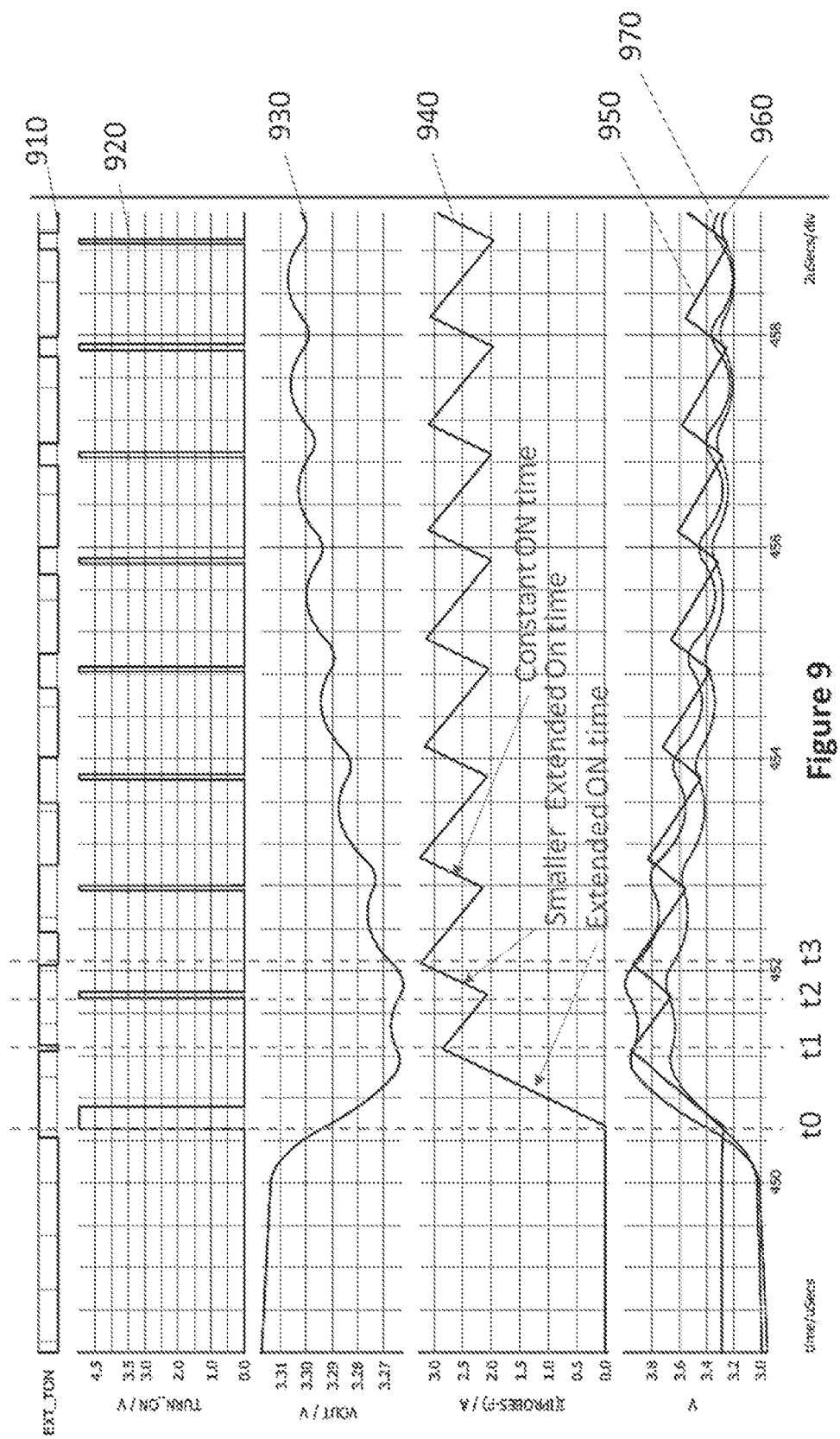
FIG. 9 is a waveform diagram illustrating the operation of the circuit of FIG. 8A.

FIG. 9 is a waveform diagram illustrating the operation of the circuit of FIG. 8A. FIG. 9 shows the EXT_TON signal 910, the TURN_ON signal 920, the output voltage VOUT 930, the inductor current 940, the FB_PLUS_RAMP signal 950, the VREF_PLUS_COMP1 signal 960 and the VREF_PLUS_COMP2 signal 970.

The signals VREF_PLUS_COMP2 970 and VREF_PLUS_COMP1 960 diverge during a load transient. At time t0, the FB-PLUS_RAMP signal 950 crosses the VREF_PLUS_COMP1 960 which turns on the high side power switch M1. The high side power switch M1 remains on until both the following conditions are true: i) the Constant On Time (COT) has elapsed and ii) the FB-PLUS_RAMP signal 950 crosses the VREF_PLUS-_COMP2 970. In this example conditions (i) and (ii) are true at time t1.

The extended on time signal 910 reduces as the output current 930 increases. For the next iteration between the times t2 and t3 the on-time is still extended but by a much smaller amount.

Figure 10A:
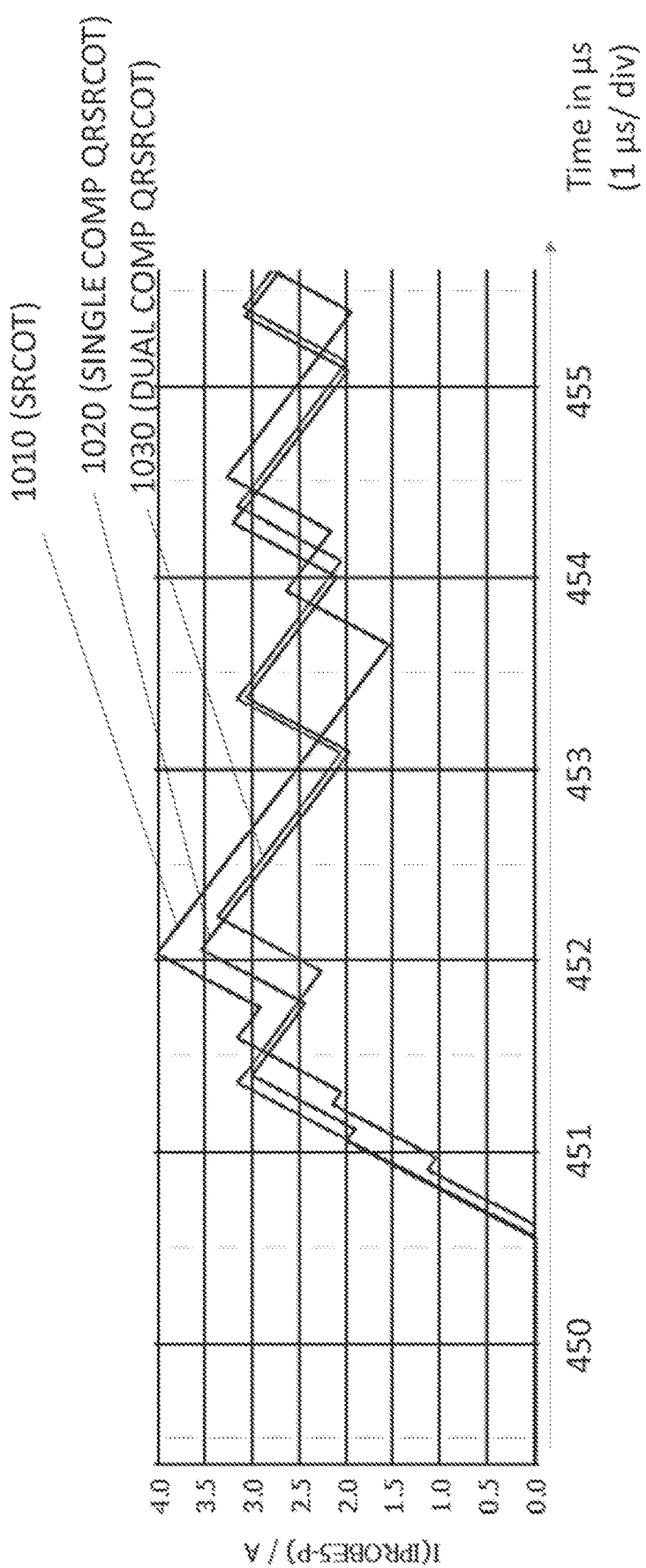
FIG. 10A is a diagram showing the inductor current IL obtained during load transient with the COT converters of FIGS. 1A, 5A and 8A, respectively.

FIG. 10A is a diagram showing the inductor current IL obtained during load transient with the COT converters of FIGS. 2A, 5A and 8A, respectively. The waveform 1010 shows the IL obtained with the conventional COT converter of FIG. 2A. The waveforms 1020 and 1030 show IL obtained with the COT converter of FIGS. 5A and 8A, respectively.

Figure 10B:
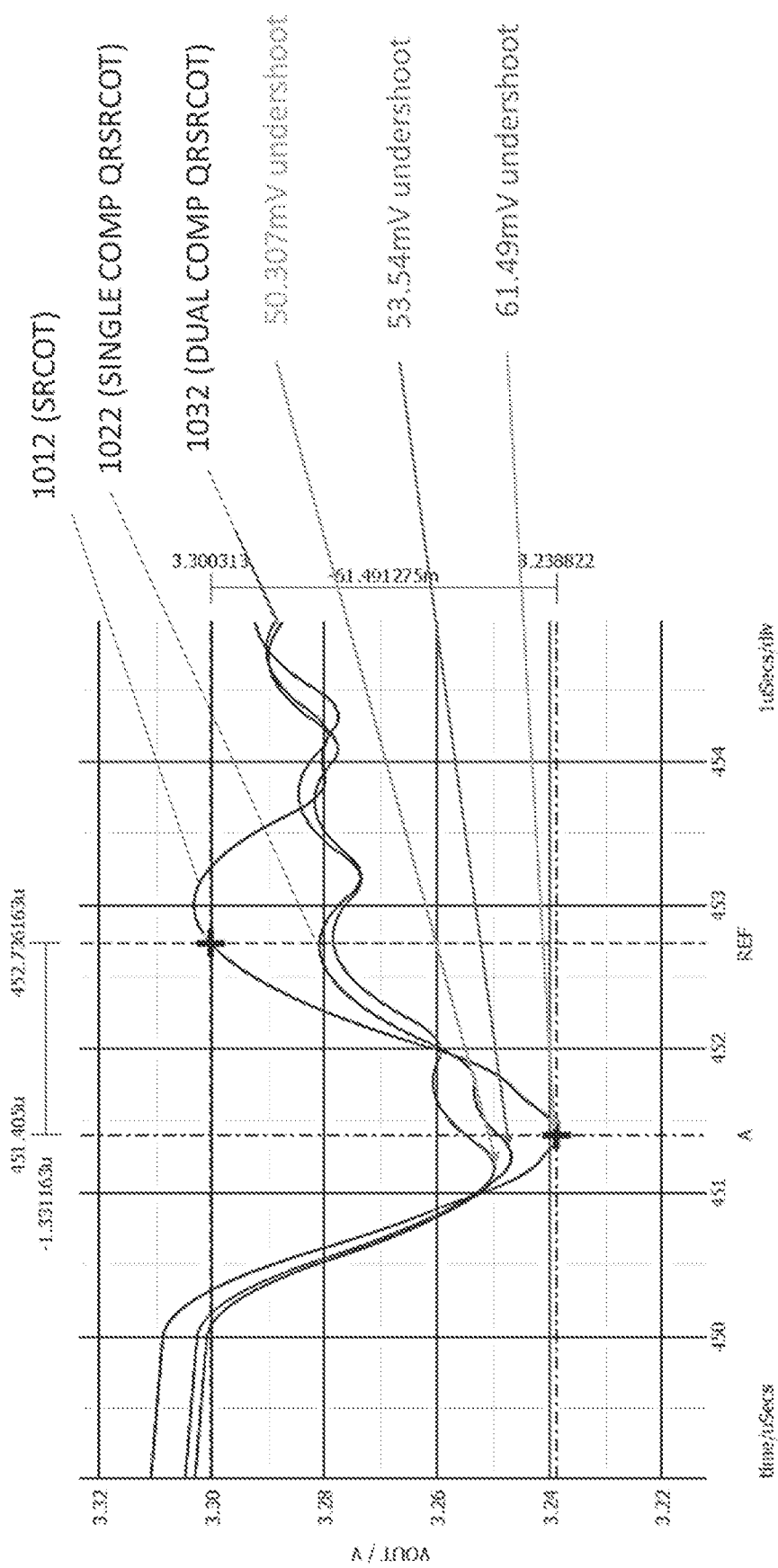
FIG. 10B is a diagram showing the output voltage Vout obtained during load transient with the COT converters of FIGS. 1A, 5A and 8A, respectively.

FIG. 10B is a diagram showing the output voltage Vout obtained during load transient with the COT converters of FIGS. 2A, 5A and 8A, respectively. The waveform 1012 shows the output voltage Vout obtained with the conventional COT converter of FIG. 2A. The waveforms 1022 and 1032 show Vout obtained with the COT converter of FIGS. 5A and 8A, respectively.

Compared to the COT converter of FIG. 2A, the converters of FIGS. 5A and 8A reduce undershoot during load transient. The dual comparator converter of FIG. 8A provides further reduction in undershoot compared with the single comparator converter of FIG. 5A.

FIG. 11A is a waveform diagram illustrating the operation of a QRSR COT converter in a pulse frequency modulation (PFM) mode.

Figure 11B:
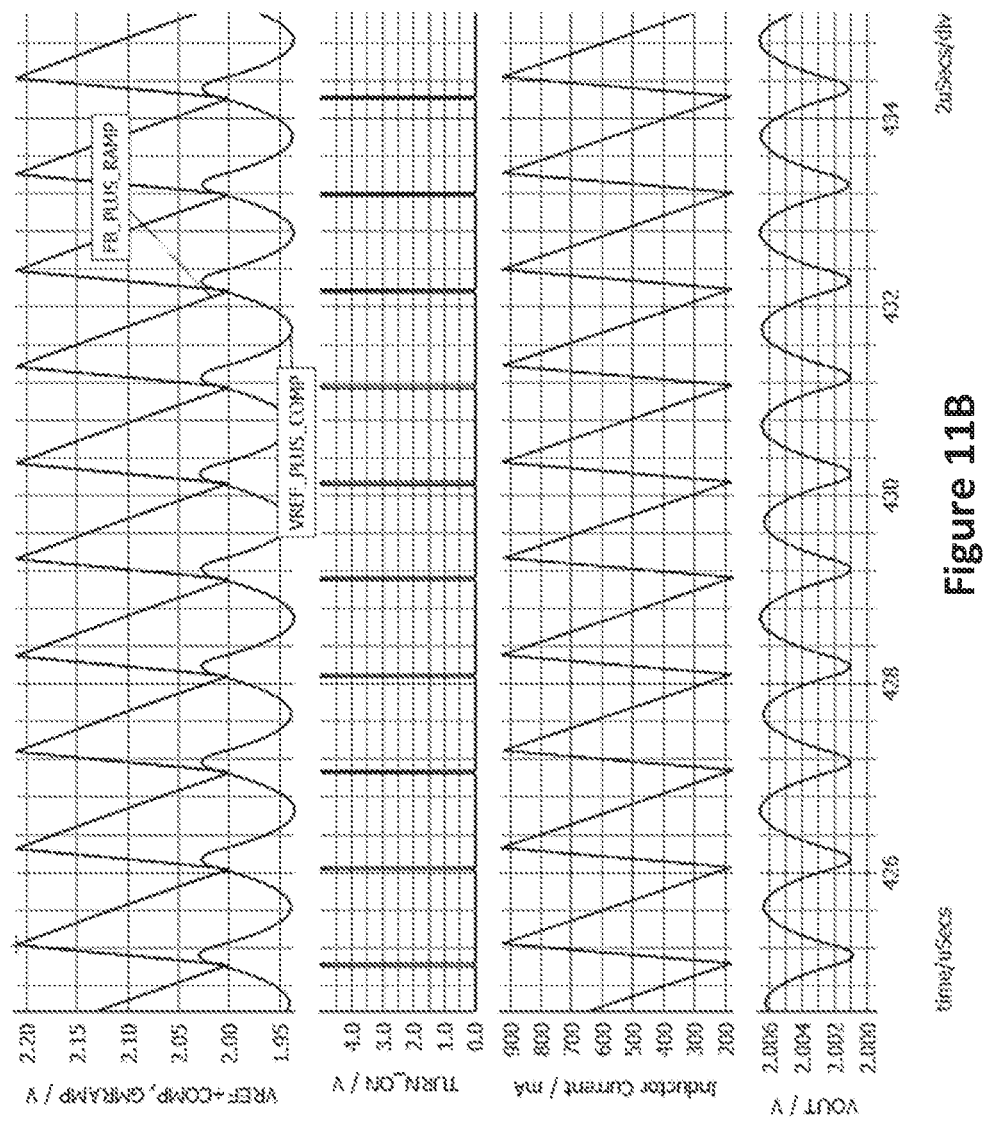
FIG. 11B is a waveform diagram illustrating the operation of a QRSR COT converter in a pulse width modulation (PWM) mode.

FIG. 11B is a waveform diagram illustrating the operation of a QRSR COT converter in a pulse width modulation (PWM) mode. During steady state SRCOT and QRSRCOT converters behave in the same way.

In summary the switching converter of the disclosure maintains a constant on time during at steady state (constant load). The on-time is increased in a controlled manner during load transient. This allows for the inductor current to increase much rapidly compared to a pure COT controller.

A skilled person will appreciate that variations of the disclosed arrangements are possible without departing from the disclosure. Accordingly, the above description of the specific embodiments is made by way of example only and not for the purposes of limitation. It will be clear to the skilled person that minor modifications may be made without significant changes to the operation described.

The invention claimed is:

1. A switching converter for providing an output voltage, the switching converter comprising:
a high side power switch coupled to a low side power switch at a switching node;
a driver adapted to generate a drive signal to drive the high side power switch, wherein the drive signal has an on-time; and
a timing circuit configured to generate a control signal to adjust the on-time during a load transient period, the control signal comprising:
a first signal for turning the high side power switch on; and
a second signal for turning the high side power switch off;
wherein the timing circuit comprises:
a first circuit adapted to generate the first signal; and
a second circuit adapted to generate the second signal, the second circuit being configured to delay assertion of the second signal until a trigger signal is asserted, so as to extend the on-time.

2. The switching converter as claimed in claim 1, wherein the timing circuit is adapted to increase the on-time when a load is increasing during the load transient period.

3. The switching converter as claimed in claim 1, wherein in a steady state the on-time remains constant.

4. The switching converter as claimed in claim 1, wherein the first circuit comprises a compensator circuit coupled to a first comparator, the first comparator having a first input for receiving a first dynamic reference signal from the compensator circuit, a second input for receiving an adjusted ramp signal, a first output for providing the first signal and a second output for providing a first trigger signal.

5. The switching converter as claimed in claim 4, wherein the first dynamic reference signal is proportional to a difference between a reference signal and the output voltage.

6. The switching converter as claimed in claim 4, wherein the first circuit comprises a second comparator, the second comparator having a first input for receiving a second dynamic reference signal from the compensator circuit, a second input for receiving the adjusted ramp signal, a first output for providing a third signal and a second output for providing a second trigger signal.

7. The switching converter as claimed in claim 6, wherein the second dynamic reference signal is proportional to a difference between a reference voltage and the output voltage.

8. The switching converter as claimed in claim 6, wherein during a transient load period the first dynamic reference signal and the second dynamic reference signal diverge.

9. The switching converter as claimed in claim 1, wherein the second circuit comprises a comparator, a capacitor circuit and a AND gate, the comparator having a first input coupled to the capacitor circuit, a second input for receiving the output voltage, and wherein the AND gate has a first input for receiving the output of the comparator, a second input for receiving the trigger signal from the first circuit, and an output for providing the second signal.

10. The switching converter as claimed in claim 4, comprising a ramp generator for generating the adjusted ramp signal, wherein the adjusted ramp signal comprises a feedback signal combined with a ramp signal.

11. The switching converter as claimed in claim 10, wherein the ramp generator comprises a synthetic ramp generator.

12. The switching converter as claimed in claim 4, wherein the first signal is high as long as the first dynamic reference signal is greater than the adjusted ramp signal.

13. The switching converter as claimed in claim 6, wherein the third signal is high as long as the second dynamic reference signal is greater than the adjusted ramp signal.

14. The switching converter as claimed in claim 4, wherein the compensator circuit comprises a transconductance amplifier coupled to a Type II dual compensator circuit.

15. A method of controlling a switching converter having a high side power switch coupled to a low side power switch, the method comprising:
generating a drive signal to drive the high side power switch, wherein the drive signal has an on-time; and
generating a control signal to adjust the on-time during a load transient period, wherein generating the control signal comprises:
generating, by a first circuit, a first signal for turning the high side power switch on;
generating, by a second circuit, a second signal for turning the high side power switch off; and
delaying, by the second circuit, assertion of the second signal until a trigger signal is asserted, so as to extend the on-time.

16. The method as claimed in claim 15, wherein, in a steady state the on-time remains constant and wherein when the load is increasing during the load transient period, the on-time is extended beyond the constant on-time.

* * * * *